United States Patent [19]

Scharlack

[11] 3,847,446

[45] Nov. 12, 1974

[54] SKID CONTROL SYSTEM FOR TANDEM AXLED VEHICLES

[75] Inventor: Ronald S. Scharlack, Watertown, Mass.

[73] Assignee: Kelsey-Hayes Company, Romulus, Mich.

[22] Filed: Dec. 23, 1971

[21] Appl. No.: 211,190

[52] U.S. Cl................ 303/21 EB, 188/181 A, 303/7
[51] Int. Cl.................................................. B60t 8/12
[58] Field of Search............ 188/181 A, 181 C, 3 R, 188/345; 303/7, 20, 21, 6 R; 317/5; 324/160–162; 340/262–263

[56] References Cited
UNITED STATES PATENTS

| | | | |
|---|---|---|---|
| 2,905,278 | 9/1959 | Kramer | 188/345 |
| 3,260,555 | 7/1966 | Packer | 303/21 EB |
| 3,511,542 | 5/1970 | Fielek, Jr. | 303/21 EB |
| 3,602,553 | 8/1971 | Cumming et al. | 303/21 EB |
| 3,606,492 | 9/1971 | Hayes | 303/21 EB |
| 3,608,979 | 9/1971 | Coyle | 303/21 EB |

*Primary Examiner*—Milton Buchler
*Assistant Examiner*—Stephen G. Kunin
*Attorney, Agent, or Firm*—Harness, Dickey & Pierce

[57] ABSTRACT

A skid control system common to a pair of closely spaced wheels located on closely spaced axles, such as in a tandem axle arrangement with the pair of wheels being those on the same side of a vehicle, the system comprising a control module providing an output signal in response to the eminence or occurrence of a skid condition at one or both of the wheels, and an actuating device responsive to the output signal for controlling the fluid pressure to the brakes of both, with the control module and/or actuating device including major portions, such as a common actuator, which serve to control the brakes at both of the pair of wheels whereby an economical system can be realized.

7 Claims, 8 Drawing Figures

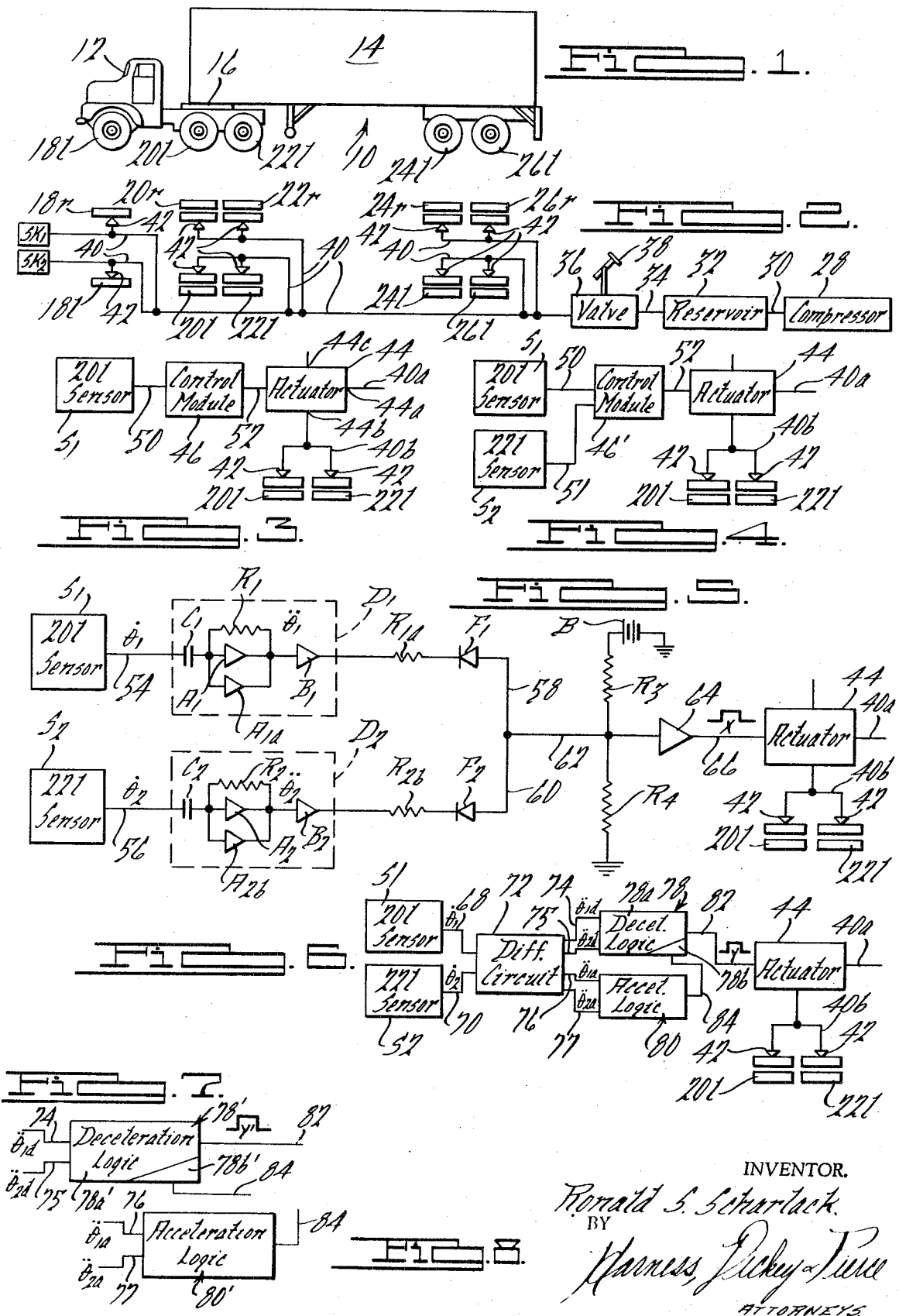

SKID CONTROL SYSTEM FOR TANDEM AXLED VEHICLES

BACKGROUND AND SUMMARY OF THE INVENTION

This disclosure pertains to skid control systems, and more particularly to a skid control system for a pair of closely or tandemly spaced, fore and aft wheels on a vehicle.

Generally speaking, braking can be maximized when the brakes are applied in such a manner as to maintain the wheels at a desirable, idealized slip condition. Should the application of the brakes result in a locked wheel or wheels, the vehicle may experience an undesirable loss of stability. Skid control systems have been utilized, however, to minimize the tendency of the wheel to lock by controlling the brake pressure.

With certain types of vehicles, skid control systems have been devised which satisfactorily control the brakes of both rear wheels as a unit. With trucks or other heavy-duty vehicles, however, because of significant variations in loading between axles and because of substantial static and dynamic variations that can occur from one side of the vehicle to the other, it has been found desirable to control each wheel separately thereby in a sense, requiring a separate skid control system for the brakes of each wheel.

For some heavy-duty vehicles, however, which have tandem axles, the two adjacent wheels on the same side of the vehicle will experience similar loading conditions and essentially the same mu (tire to road) conditions. Thus, in the present invention it is proposed to provide a skid control system having major components that are common for controlling the brakes of the adjacent tandem wheels. It is therefore a general object of the subject invention to provide a skid control system having major components that are common for controlling the brakes of a pair of tandemly spaced, or closely located wheels.

While the loading and mu conditions are essentially similar, it is also well known that during braked deceleration of a vehicle there is a dynamic load transfer directed toward the forward end of the vehicle. It is therefore another object of the subject invention, to provide a skid control system for closely spaced, fore and aft, wheels which controls the brakes to both wheels in response to the conditions occurring at the forward wheel of the pair.

While in the present invention the adjacent, tandemly spaced wheels can be controlled by a system of the type recited, in order to enhance vehicle stability, the front steerable wheels are individually skid controlled. Note that in controlling the pair of tandemly spaced wheels together, should one of the controlled pair become locked, vehicle stability will still be maintained by virtue of the other wheel being maintained in a rolling state. It is therefore a further object of the subject invention for a heavy-duty vehicle to provide separate skid control systems for the front steerable wheels and to provide a common skid control system for the controlled pair.

In another form of the invention both fore and aft wheels are monitored and the brake pressure is controlled to both through a common actuator upon the occurrence of an incipient skid condition at both wheels. Therefore, it is still another object of the subject invention to provide a skid control system wherein relief of the brakes is provided in response to both wheels being in an incipient wheel skid condition.

In another aspect of the invention the brakes for both the fore and aft wheels are controlled by a common actuator such that during a skid control cycle both are reapplied when a first of the two wheels spins-up. This assures that neither wheel will run at synchronous speed. Therefore, it is an object of the present invention to provide a skid control system of the above described type in which the brakes to the fore and aft wheels are reapplied in a skid control cycle when the first wheel spins-up.

In another form of the subject invention the brakes are reapplied only after both wheels spin-up. In some circumstances the latter type of operation is advantageous as, for example, when there is or may be a good likelihood of an unbalance between the brakes of the two wheels. Therefore, it is yet another object of the present invention to provide a system of the above described type in which the brakes are reapplied in a skid control cycle in response to both wheels spinning-up.

Other objects, features, and advantages of the present invention will become apparent from the subsequent description and the appended claims, taken in conjunction with the accompanying drawings:

BRIEF DESCRIPTION OF THE DRAWINGS

FIG. 1 is a side elevational view of an exemplary tractor and semi-trailer combination wherein the subject invention may be advantageously utilized;

FIG. 2 is a partial schematic and block diagram of the tractor, semi-trailer combination of FIG. 1 illustrating the wheel arrangement thereof and an exemplary braking system therefor;

FIG. 3 is a partial schematic and block diagram of a preferred embodiment of the subject invention relative to a pair of exemplary tandemly, fore and aft, spaced wheels located on either the tractor or semi-trailer of FIG. 1;

FIG. 4 is a partial schematic and block diagram of a modified form of the embodiment of FIG. 3;

FIG. 5 is a partial schematic and block diagram of a different form of the invention of FIG. 3;

FIG. 6 is a partial schematic and block diagram of another form of the embodiment of FIG. 5;

FIG. 7 is a partial schematic and block diagram of a modification of the invention illustrated in FIG. 6; and FIG. 8 is a partial schematic and block diagram of a further modification of the invention illustrated in FIGS. 6 and 7.

DETAILED DESCRIPTION OF THE PREFERRED EMBODIMENTS

With reference now to FIG. 1 of the drawings, an exemplary vehicle is indicated generally at 10. The vehicle 10 is comprised of a tractor 12 pivotably connected through a fifth wheel 16 to a semi-trailer 14. The tractor 12 includes a pair of front wheels 18*l* and 18*r* which support the front end of the tractor 12, the letter *l* denoting the left side of the vehicle 10 whereas the letter *r* designates the right hand side. Since the wheels 18*l* and 18*r* are adapted for steering the tractor 12, separate skid control systems SK1 and SK2, respectively, are provided for each. The individual systems SK1 and SK2 can be similar to the system disclosed in U.S. Pat. No. 3,515,440 to P. Every, et al, that patent being incorporated herein by reference. The rearward end of the tractor 12 is supported by a tandem axle arrangement, the forwardly located axle having wheels 20*l* and 20*r* and the rearward axle having wheels 22*l* and 22*r*. Accordingly, the rearward end of the semi-trailer 14 is supported by a pair of tandem axles, the forwardly located axle relative to the tractor 12 having wheels 24*l* and 24*r* and the rearward axle having wheels 26*l* and 26*r*.

Heavy-duty vehicles such as the vehicle 10 conventionally utilize a compressed air brake system. With reference to FIG. 2, an exemplary air brake system is schematically illustrated for individually braking the wheels 18*l* and 18*r* through 26*l* and 26*r*, the specific details of the system itself forming no part of the present invention. By way of explanation, however, a source of compressed air is supplied from a compressor 28 which is drivingly connected to the vehicle engine (not shown). The compressor 28 is connected via a conduit 30 to an air reservoir 32 wherein the air is stored for use in the braking system so as to permit several applications of the brakes. Each of the wheels 18*r* and 18*l* through 26*r* and 26*l* are individually equipped with a brake chamber 42, the chambers 42 being operatively connected to a brake valve 36 via a system of suitable conduits and hoses 40. The brakes of the vehicle 10 are applied by the compressed air acting on the brake chambers 42 which are controlled by operation of the brake valve 36 via manipulation of a brake pedal 38. Likewise, the brakes are relieved by releasing the compressed air from the brake chambers 42 by release of the pedal 38.

As previously noted, it has been common with heavyduty vehicles to provide an independent skid control system for each wheel to individually accommodate variations in loading and road to tire mu conditions. In the present invention, however, a simpler, less expensive system is provided in which the fore and aft wheels at one side of a tandem axle arrangement are skid controlled by a system having major common components. Note that in such a system the fore and aft wheels which are located on a common side of a tandem axle arrangement having substantially similar static loads and both will be exposed to similar tire to road surface mu conditions. Thus, the skid control system of the subject invention is adapted to be applied to both of any of the tandemly spaced wheels 20*l* and 22*l*, 20*r* and 22*r*, 24*l* and 26*l*, and 24*r* and 26*r*. For purposes of explanation and description, however, the various forms and embodiments of the subject invention will be described in conjunction with wheels 20*l* and 22*l*, the operation of such wheels being typical with the operation of the three remaining sets.

With reference now to FIG. 3, a partial block diagram of a preferred embodiment of a skid control system is shown, which can function in a manner similar to that disclosed in U.S. Pat. No. 3,515,440 (supra). The wheels 20*l* and 22*l* each include a brake chamber 42 which is adapted to brake the wheels via compressed air which is supplied via conduits and hoses 40 to the chambers 42. An actuator or brake pressure modulator 44 is disposed in the fluid line or conduit 40 and defines sub conduits 40*a* and 40*b*, conduit 40*a* being connected to the brake valve 36 and conduit 40*b* interconnecting the actuator 44 with the brake chambers 42 located on each of the wheels 20*l* and 22*l*. The actuator 44 under normal braking conditions provides an unrestricted path allowing the compressed air to pass between the valve 36 to the pair of brake chambers 42 and upon actuation is adapted to connect the conduit 44*b* to atmosphere while blocking fluid communication from conduit 40*a*. In this regard, the actuator 44 may be an electrically operated three-way valve having a first port 44*a* connected to the conduit 40*a*, a second port 44*b* connected to conduit 40*b*, and a third port 44*c* connected to atmosphere. In the deactuated position of the actuator 44, the ports 44*a* and 44*b* are in fluid communication and port 44*c* is blocked. Upon energization, the actuator 44 will reverse the communication of the ports wherein the port 44*a* is blocked and ports 44*b* and 44*c* are interconnected. In this position it will be noted that the brake pressure in conduit 40*b* will be relieved to atmosphere and the conduit 40*a* will be effectively blocked from communication of any further pressurized air.

The actuator 44 is adapted to be actuated in accordance with an electrical signal obtained from an electrical control module 46. The control module 46 receives wheel speed information from sensor S1 associated with the brake drums of the wheel 20*l* as by means of suitably located exciter rings (not shown). The exciter rings and sensor S1 can be of a construction known in the art such that as the exciter ring is rotated with the brake drum (and hence with the wheel 20*l*), the sensor S1 will provide a pulsating or alternating electrical signal via conductor 50 to the module 46, which signal would be an indication of the rotational velocity of the wheel 20*l*.

The control module 46 can be constructed to sense the rate of change in the signal at the conductor 50 and hence to sense the deceleration rate of the wheel 20*l* associated with the brake drum, and to provide an output signal in response to the magnitude of the deceleration of the wheel 20*l* reaching a preselected magnitude indicative of an incipient skid condition occurring at the wheel associated with the drum. The output or control signal will be transmitted by means of a conductor 52 to the actuator 44. In U.S. Pat. No. 3,515,440 (supra), the control module similar to module 46 was adapted to provide merely an "on" or "off" signal. Thus, upon energization the actuator 44 will block air supply from the brake valve 36 while at the same time communicate the brake chambers 42 to atmosphere via the port 44*c*. Relief of the compressed air from the chambers 42 will result in release of the brakes and will allow both of the wheels 20*l* and 22*l* to spin-up resulting in cessation of the output signal from the control module 46. Upon cessation of the output signal the actuator 44 will be de-energized whereby communication of compressed air from the brake valve 36 to both of the brake chambers 42 is restored and port 44*c* is again blocked from atmosphere. Subsequent cycles will be continued until the wheel skid condition is remedied, or conversely until the brake pedal 38 is released by the vehicle operator. It will be noted in the preferred embodiment that the brakes of both of the wheels 20*l* and 22*l* are simultaneously controlled in accordance with conditions occurring in the forwardly located wheel 20*l* relative to the front of the vehicle, the forwardly oriented wheel 20*l* being connected to that axle having the slightly higher load distribution due to dynamic load transfer towards the front of the vehicle during braking.

Thus, in the system of FIG. 3, only one wheel speed sensor S1 for electronic control module 46 is required, at the same time a single actuator 44 serves to control the fluid pressure to the brakes of both of the wheels 20l, 22l.

A second form of the present invention is illustrated in FIG. 4, wherein identical components are designated by the same numerals used in FIG. 3, and with modified components being designated by like numerals having the addition of a prime ('). In the second form, a pair of sensors S1 and S2 are provided for each of the wheels 20l and 22l, respectively. Each of the sensors S1 and S2 is adapted to provide a pulsating or alternating electrical wheel speed signal via conductors 50 and 51, respectively, to a modified control module 46'. The control module 46' is adapted to average the signals for the sensors S1 and S2. Module 46' will provide an output signal in response to the magnitude of the deceleration of the average speed of the pair of wheels 20l and 22l reaching a preselected magnitude corresponding to the occurrence of an incipient skid condition at the wheels. The brakes are released by relief of the compressed air via the actuator 44 in response to the output signal and both wheels are allowed to spin-up. Thus, in this form of the invention the condition at the wheel 22l is considered and contributes to the information utilized by the control module 46'. Note, however, that again both of the wheels 20l and 22l are controlled by a common actuator 44. Note further for either the first or second forms of the invention, vehicular stability will be maintained even if one wheel is in a locked condition because of the rolling state of the other wheel of the pair.

In the U.S. Pat. application of E. J. Hayes, Ser. No. 805,318, filed Mar. 7, 1969, now U.S. Pat. No. 3,606,492, a skid control system was disclosed for a wheeled vehicle having at least two of the wheels connected to a common device which was actuated to relieve brake pressure in response to both of the two wheels being in a skid condition. That system can be utilized in part in the present invention and hence that disclosure is incorporated herein by reference.

In FIG. 5 a modified system utilizing a part of the system shown in the subject Hayes application is illustrated having a control cycle in which brake pressure is relieved only when both wheels are in a detected skid condition and is reapplied when either wheel spins-up. In the system shown, a preselected deceleration rate of the wheel is selected as an indication of an incipient skid and a preselected acceleration rate of the wheel (spin-up) is selected as an indication of wheel recovery. In FIG. 5, wheel speed sensors S1 and S2 provide output signals $\theta \dot{1}$ and $\theta \dot{2}$, the magnitudes of which are indicative of the speed of wheels 20l and 22l, respectively. The velocity signals are transmitted to differentiating circuit D1 and D2, respectively, via conductors 54 and 56, respectively. Differentiating circuit D1 comprises a coupling capacitor C1 and an amplifier A1 which is shunted by a resistor R1; the result is a differentiated signal $\theta \ddot{1}$ at circuit D1. Circuit D2 is similar and like components have been given similar letter designations with the addition of subscripts "2," the circuit D2 providing a differentiated signal $\theta \ddot{2}$. The differentiating circuits D1 and D2 have amplifiers B1 and B2 which are normally "on" or conductive and will be rendered nonconductive in response to the associated signals $\theta \ddot{1}$ and $\theta \ddot{2}$ attaining a preselected magnitude indicative of incipient skid of the related wheels 20l or 22l.

A control amplifier 64 has its input 62 connected to B+ via resistor R3 and to ground via resistor R4. Resistors R3 and R4 provide the bias for amplifier 64 and will normally maintain it biased "off" (or nonconductive) as long as either amplifier B1 and B2 is "on."

Thus, with the amplifier B1 "on", resistor R4 would be shunted by diode $F_1$ (connected to conductor 62 via conductor 58) and a resistor R1a connected between diode F1 and differentiating circuit D1 such that the voltage across R4 would be reduced maintaining amplifier 64 "off." In a similar manner amplifier B2 when "on" will maintain amplifier 64 "off" by means of diode F2 and resistor R2b. Amplifier 64 controls the actuator 44 which in turn controls the brakes to the wheels 20l and 22l, respectively. Actuator 44 may be identical to actuators previously described and is operable in a similar manner. In response to an output signal X from amplifier 64 via conductor 66, the actuator 44 will be energized to relieve pressure to the brakes from wheels 20l and 22l and upon cessation of signal X from amplifier 64, the actuator 44 will be de-energized for reapplication of the brakes. In operation for normal brake stops neither wheel 20l nor 22l will be decelerated excessively and the amplifier 64 will not be actuated to generate signal X.

Assume now that the brakes have been applied excessively and that the forwardly oriented wheel 20l decelerates more rapidly than the rearwardly oriented wheel 22l, the speed signal $\theta \dot{1}$ will have a rate of change which corresponds to the deceleration of wheel 20l, and will be detected by differentiating circuit D1. When the signal $\theta \ddot{1}$ attains a preselected magnitude indicative of an incipient skid condition at wheel 20l, amplifier B1 will be rendered nonconductive. Amplifier B2 is still conductive, however, and amplifier 64 cannot be turned on since diode F2 still conducts and provides a parallel, low impedance circuit across bias resistor R4. Thus, brake pressure will not be relieved by actuator 44 if only one of the wheels 20l and 22l approach a skid condition. When the other wheel 22l also decelerated excessively and signal $\theta \ddot{2}$ attains a preselected magnitude indicative of incipient skid, amplifier B2 will be rendered nonconductive. Now with both amplifiers B1 and B2 both nonconductive both diodes F1 and F2 will be biased "off" and the potential at resistor R2 can rise to a level turning amplifier 64 "on" producing signal X for energizing the actuator 44 whereby pressure to the brakes for wheels 20l and 22l will be relieved.

Amplifier B1 once rendered nonconductive will remain nonconductive until either a preselected internal has elapsed after the deceleration signal $\theta \ddot{1}$ has diminished from the magnitude which rendered B1 nonconductive or until an actuating signal has been received indicating that the wheel 20l has spun-up. Amplifier B2 operates in a similar manner. Thus, the brakes will remain relieved until one of the amplifiers B1 or B2 has timed out, or one of the wheels spins-up to a preselected magnitude of acceleration.

The differentiating circuit D1 includes a second amplifier A1a which is responsive to acceleration of the wheel 20l or to the rate of change of increase of magnitude velocity signal $\theta \dot{1}$. Thus, when $\theta \dot{1}$ reaches a magnitude indicative of the preselected magnitude of wheel spin-up, amplifier A1a will be actuated to turn amplifier B1 "on." With amplifier B1 "on" the potential across resistor R4 will drop turning amplifier 64 "off" which de-actuates actuator 44 whereby pressure will be reapplied to both the wheels 20*l* and 22*l*. In a similar manner, the differentiating circuit D2 is responsive to a spin-up signal provided by amplifier A2*b*. The system of FIG. 5 is operative to provide a skid control cycle in which brake pressure is relieved at both wheels 20*l* and 22*l* only when both wheels are in an incipient skid condition and brake pressure will be reapplied when either wheel 20*l* and 22*l* spins-up to a selected acceleration rate. Thus, the embodiment is advantageous for a condition in which there may be unbalance between the brakes for wheels 20*l* and 22*l*. Note, however, that the system utilizes a common actuator 44 for relieving fluid pressure to the brakes which is responsive to the wheels 20*l* and 22*l* both being in an incipient skid condition. Note further that in the event one wheel becomes locked directional stability of the vehicle can still be attained by virtue of the other wheel continuing to roll.

Another form of the invention is illustrated in FIG. 6. For purposes of clarity the schematic block diagram of FIG. 6 is designated by identical numerals and letters for components common to the forms previously described in FIGS. 3–5. In this system the brake pressure is relieved in response to both of the wheels 20*l* and 22*l* being in an incipient skid condition and reapplied only after both wheels 20*l* and 22*l* have spun-up. The system is comprised of a pair of sensors S1 and S2 which provide rotational speed output signals $\dot{\theta}1$ and $\dot{\theta}2$ to a differentiating circuit 72 via conductors 68 and 70, respectively.

The differentiating circuit 72 in response to the rate of change of the signals $\dot{\theta}1$ and $\dot{\theta}2$ provides output signals $\ddot{\theta}_{1d}$ and $\ddot{\theta}_{2d}$ indicative of the deceleration of each of the wheels 20*l* and 22*l*, respectively, and output signals $\ddot{\theta}_{1a}$ and $\ddot{\theta}_{2a}$ indicative of the respective acceleration thereof. The signals $\ddot{\theta}_{1d}$ and $\ddot{\theta}_{2d}$ are transmitted via conductors 74 and 75 to a latching circuit portion 78*a* of a deceleration logic circuit 78, the circuit 78 further including a de-latching circuit portion 78*b*. Correspondingly, the signals $\ddot{\theta}_{1a}$ and $\ddot{\theta}_{2a}$ are transmitted via conductors 76 and 77 to an acceleration logic circuit 80 which in turn is operatively connected to the de-latching circuit portion 78*b* by a conductor 84. The latching circuit portion 78*a* is operatively connected to the actuator 44 by a conductor 82 and is adapted to provide an output signal Y in response to the circuit portion 78*a* being rendered conductive. Once rendered conductive the circuit 78*a* will remain conductive until de-actuated by the de-latching circuit 78*b* upon command of the acceleration logic circuit 78*b* as shall hereinafter become apparent.

In operation the latching circuit portion 78*a* is rendered conductive by a preselected magnitude of each of the signals $\ddot{\theta}_{1d}$ and $\ddot{\theta}_{2d}$ indicating an incipient skid condition to be occurring at both of the wheels 20*l* and 22*l*. When the portion 78*a* is conductive the signal Y will be transmitted to the actuator 44 and in response thereto the brake fluid pressure will be relieved. Reflief of the brake pressure will allow the wheels 20*l* and 22*l* to spin-up or accelerate which will be sensed by the sensors S1 and S2 again in the form of signals $\dot{\theta}_1$ and $\dot{\theta}_2$. In response to these signals, the differentiating circuit will provide output signals $\ddot{\theta}_{1a}$ and $\ddot{\theta}_{2a}$ indicative of the rate of acceleration of the wheels 20*l* and 22*l*. When each of the signals $\ddot{\theta}_{1a}$ and $\ddot{\theta}_{2a}$ reaches a preselected magnitude indicative of wheel recovery of both of the wheels 20*l* and 22*l*, the signal Y will be terminated by the de-latching circuit 78*b* in response to a command signal from the acceleration logic circuit 80. When the circuit 78*a* is rendered non-conductive, the actuator 44 is de-energized and compressed air is again communicated to the brake chambers 42 via the conduits 40*a* and 40*b*. The sequence may be repeated numerous times to bring the vehicle 10 to a stop or until the brakes are released by manual operation of the brake pedal 38.

If desired, the form of the invention illustrated in FIG. 6 is susceptible to further modification by substitution of a different form of the deceleration logic circuit 78. For example, a deceleration logic circuit can be provided having a latching circuit portion which is responsive to either of the wheels 20*l* and 22*l* being in an incipient skid condition with the remaining components illustrated in FIG. 6 being unchanged. This form of the invention is illustrated in FIG. 7, wherein deceleration logic circuit 78' is substituted for the circuit 78 of FIG. 6 and wherein modified components are indicated by the same numerals as in FIG. 6, but are designated by a prime ('). In a manner identical with the invention illustrated in FIG. 6, and with reference thereto and FIG. 7, the differentiating circuit 72 receives rotational wheel information in the form of signals $\dot{\theta}_1$ and $\dot{\theta}_2$ from wheel sensors S1 and S2 associated with the wheels 20*l* and 22*l*, respectively. In response to the signals $\dot{\theta}_1$ and $\dot{\theta}_2$ the differentiating circuit provides output signals $\ddot{\theta}_{1d}$ and $\ddot{\theta}_{2d}$ to deceleration logic circuit 78' via conductors 74 and 75, the signals $\ddot{\theta}_{1d}$ and $\ddot{\theta}_{2d}$ being indicative of the rate of deceleration of the wheels 20 *l* and 22*l*, respectively. The differentiating circuit 72 also provides output signals $\ddot{\theta}_{1a}$ and $\ddot{\theta}_{2a}$ to acceleration logic circuit 80 via conductors 76 and 77, the signals $\ddot{\theta}_{1a}$ and $\ddot{\theta}_{2a}$ being indicative of the rate of acceleration thereof. As before indicated, however, a latching circuit portion 78*a*' of the deceleration logic circuit 78' is rendered conductive if either the magnitude of $\ddot{\theta}_{1d}$ or $\ddot{\theta}_{2d}$ indicates an incipient skid condition to be occurring at either of the wheels 20*l* or 22*l*. Therefore, in response to a preselected magnitude of either of the signals $\ddot{\theta}_{1d}$ and $\ddot{\theta}_{2d}$ the latching circuit portion 78*a*' will provide an output signal Y' to the actuator 44 via the conduit 82. Upon such an occurrence, the brake pressure will be relieved and both of the wheels will recover in a manner identical with the version of the invention described in conjunction with FIG. 6 based upon wheel recovery of both of the wheels 20*l* and 22*l*, i.e., based upon each of the signals $\ddot{\theta}_{1a}$ and $\ddot{\theta}_{2a}$ reaching a preselected magnitude wherein the acceleration logic circuit 80 (see FIG. 6) will de-energize the actuator 44 by operation of a de-latching circuit portion 78*b*' which can be identical to the circuit 78*b*.

If desired, however, the form of the invention illustrated in FIG. 7 is subject to further modification wherein the brakes can be relieved in response to either one of the wheels 20*l* and 22*l* being in an incipient skid condition and reapplied in response to either of the wheels 20*l* and 22*l* recovering or spinning-up. This form of the invention utilizes a deceleration logic circuit identical to the circuit 78' described in FIG. 7 and additionally includes the substitution of an acceleration logic circuit 80' (see FIG. 8) responsive to a preselected magnitude of either of the acceleration output signals $\ddot{\theta}_{1a}$ and $\ddot{\theta}_{2a}$ individually indicating wheel recovery of the wheels 20*l* and 22*l*. For purposes of clarity, in FIG. 8 identical components are indicated by the same numerals with substituted components being further designated by a double prime ('').

Considering FIG. 8 and with reference then to FIGS. 6 and 7, differentiating circuit 72 receives rotational wheel information or signals $\dot{\theta}_1$ and $\dot{\theta}_2$ via conductors 68 and 70 from the wheels 20*l* and 22*l*, respectively. In response to the signals $\dot{\theta}_1$ and $\dot{\theta}_2$ the differentiating circuit 72 provides output signals $\ddot{\theta}_{1d}$ and $\ddot{\theta}_{2d}$ via conductors 74 and 75 to the deceleration logic circuit 78' having a latching circuit portion 78a' which is adapted to be rendered conductive should the magnitude of either of the signals $\ddot{\theta}_{1d}$ or $\ddot{\theta}_{2d}$ indicate an incipient wheel condition to be occurring at either of the wheels 20*l* and 22*l*, respectively, and provide brake relief in a manner identical with the system described in conjunction with FIG. 7. In FIG. 8, however, an acceleration logic circuit 80' provides reapplication of the brakes in response to the spin-up or recovery of either of the wheels 20*l* and 22*l* as indicated by the magnitude of signals $\ddot{\theta}_{1a}$ and $\ddot{\theta}_{2a}$ as transmitted to the acceleration logic circuit 80' via the conductors 76 and 77. Should either of the signals $\ddot{\theta}_{1a}$ and $\ddot{\theta}_{2a}$ depict a magnitude indicating wheel recovery, the de-latching circuit 78b' will render the latching circuit portion 78a' non-conductive upon command of the circuit 80'. Thus, in the system of FIG. 8, should either of the wheels 20*l* or 22*l* be detected in an incipient skid condition, brake pressure is relieved and subsequently reapplied in response to a selective magnitude of wheel recovery of either of the wheels 20*l* or 22*l* as indicated by the magnitude of the signals $\ddot{\theta}_{1a}$ or $\ddot{\theta}_{2a}$.

It will be noted that all forms of the present invention illustrated in FIGS. 3–8 enhance vehicle stability since separate skid control systems are provided for each of the front steerable wheels 18*r* and 18*l*, and because of the fact that at least one of the closely tandemly located pairs of wheels will tend to be in a rolling state. Moreover, it will be appreciated that all forms of the present invention utilize a common actuator and/or other components which result in economies relative to systems which provide a separate system for each of the wheels of the vehicle. While the present invention has been disclosed for use with two wheels which are tandemly mounted, it should be understood that features of the invention are susceptible for use in a closely, spaced plurality of tandemly located wheels which plurality can comprise more than two wheels.

Thus, while it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A skid control system for a pair of tandemly located, proximately spaced, fore and aft wheels of a wheeled vehicle having a pressurized fluid actuated braking system comprising:
   control means for detecting the occurrence of an incipient wheel skid condition at at least one of the wheels and providing an output signal in response thereto, said control means including a sensor means located at only one of said fore and aft wheels for providing rotational speed information, and control module means for receiving said information and providing said output signal in response to said information; and common actuating means responsive to said output signal for controlling the pressure to the brakes at both of the fore and aft wheels.

2. The system as recited in claim 1 wherein said sensor means is located at said fore wheel.

3. The system as recited in claim 1 wherein said common actuating means is an electrically operated valve responsive to said output signal, said valve having a first position wherein pressurized fluid is communicated to the brakes of both of the fore and aft wheels and a second condition wherein the pressurized fluid is relieved to the brakes of both of the fore and aft wheels.

4. The system as recited in claim 3, for use with a vehicle having a pair of front steerable wheels in combination with individual front skid control means for independently controlling the brakes for each of said front steerable wheels.

5. A skid control system for a pair of tandemly located, proximately spaced, fore and aft wheels of a wheeled vehicle having a pressurized fluid actuated braking system comprising:
   control means for detecting the occurrence of an incipient wheel skid condition, said control means including a pair of sensors for providing rotational speed information of both the fore and aft wheels;

control module means for receiving said information and providing an electrical output signal in response to a preselected average of said rotational speed information; and
   common actuating means responsive to said output signal for controlling the pressure to the brakes of both of the fore and aft wheels.

6. The system as recited in claim 5 wherein said common actuating means is an electrically operated valve responsive to said output signal, said valve having a first position wherein pressurized fluid is communicated to the brakes of both of the fore and aft wheels and a second condition wherein the pressurized fluid is relieved to the brakes of both of the fore and aft wheels.

7. The system as recited in claim 6 for use with a vehicle having a pair of front steerable wheels in combination with individual front skid control means for independently controlling the brakes for each of said front steerable wheels.

* * * * *